United States Patent
Takada et al.

(10) Patent No.: US 9,482,133 B2
(45) Date of Patent: Nov. 1, 2016

(54) EXHAUST EMISSION CONTROL SYSTEM OF INTERNAL COMBUSTION ENGINE

(71) Applicants: Keishi Takada, Kanagawa-ken (JP); Nobumoto Ohashi, Shizuoka-ken (JP); Shigeki Nakayama, Gotemba (JP); Akira Mikami, Susono (JP); Kenji Sakurai, Uji (JP); Junichi Matsuo, Susono (JP); Yoshihisa Tsukamoto, Susono (JP); Hiroshi Otsuki, Gotemba (JP); Ichiro Yamamoto, Kariya (JP)

(72) Inventors: Keishi Takada, Kanagawa-ken (JP); Nobumoto Ohashi, Shizuoka-ken (JP); Shigeki Nakayama, Gotemba (JP); Akira Mikami, Susono (JP); Kenji Sakurai, Uji (JP); Junichi Matsuo, Susono (JP); Yoshihisa Tsukamoto, Susono (JP); Hiroshi Otsuki, Gotemba (JP); Ichiro Yamamoto, Kariya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/652,830

(22) PCT Filed: Dec. 18, 2012

(86) PCT No.: PCT/JP2012/082796
§ 371 (c)(1),
(2) Date: Jun. 17, 2015

(87) PCT Pub. No.: WO2014/097391
PCT Pub. Date: Jun. 26, 2014

(65) Prior Publication Data
US 2015/0322837 A1 Nov. 12, 2015

(51) Int. Cl.
*F01N 3/20* (2006.01)
*B01D 53/94* (2006.01)
(Continued)

(52) U.S. Cl.
CPC .......... *F01N 3/208* (2013.01); *B01D 53/9477* (2013.01); *B01D 53/9495* (2013.01); *F01N 3/0253* (2013.01); *F01N 3/035* (2013.01); *F01N 3/103* (2013.01); *F01N 3/106* (2013.01); *F01N 3/2066* (2013.01); *F01N 9/002* (2013.01);
(Continued)

(58) Field of Classification Search
None
See application file for complete search history.

(56) References Cited

U.S. PATENT DOCUMENTS

2005/0031514 A1 2/2005 Patchett et al.
2007/0137184 A1 6/2007 Patchett et al.
(Continued)

FOREIGN PATENT DOCUMENTS

JP 2007-501353 1/2007
JP 2008-157188 7/2008

*Primary Examiner* — Walter D Griffin
*Assistant Examiner* — Jelitza Perez
(74) *Attorney, Agent, or Firm* — Finnegan, Henderson, Farabow, Garrett & Dunner, LLP

(57) ABSTRACT

In order to suppress ammonia from flowing out during regeneration treatment of a filter carrying an SCR catalyst, the prevent invention provides an exhaust emission control system of an internal combustion engine, including a first stage catalyst having an oxidation function, a fuel supply device configured to supply fuel to the first stage catalyst, a filter provided in the exhaust passage downstream of the first stage catalyst and carrying a selective redaction type NOx catalyst, an ammonia supply device configured to supply ammonia to the filter, a filter-regeneration-treatment executing unit configured to execute filter regeneration treatment, and a control unit configured to supply, when the filter regeneration treatment is not executed, the ammonia in an amount corresponding to an amount of the NOx emitted from the internal combustion engine, and to supply, when the filter regeneration treatment is executed, the ammonia in an amount corresponding to an amount of the NOx obtained by subtracting, from the amount of the NOx emitted from the internal combustion engine, an amount of the NOx reduced by the fuel which passes through the first stage catalyst.

3 Claims, 7 Drawing Sheets

(51) Int. Cl.
  *F01N 3/10*   (2006.01)
  *F01N 9/00*   (2006.01)
  *F01N 3/025*  (2006.01)
  *F01N 3/035*  (2006.01)
  *F01N 13/00*  (2010.01)

(52) U.S. Cl.
  CPC ....... *F01N13/009* (2014.06); *B01D 2255/904* (2013.01); *F01N 2510/06* (2013.01); *F01N 2560/026* (2013.01); *F01N 2610/02* (2013.01); *F01N 2900/08* (2013.01); *Y02T 10/24* (2013.01); *Y02T 10/47* (2013.01)

(56) References Cited

U.S. PATENT DOCUMENTS

| | | |
|---|---|---|
| 2008/0132405 A1 | 6/2008 | Patchett et al. |
| 2009/0255241 A1 | 10/2009 | Patchett et al. |
| 2010/0319320 A1* | 12/2010 | Mital .................. F01N 3/035 60/285 |
| 2012/0034133 A1 | 2/2012 | Patchett et al. |
| 2014/0349841 A1 | 11/2014 | Patchett et al. |
| 2015/0011377 A1 | 1/2015 | Patchett et al. |
| 2015/0126358 A1 | 5/2015 | Patchett et al. |

* cited by examiner

EXHAUST EMISSION CONTROL SYSTEM OF INTERNAL COMBUSTION ENGINE

CROSS-REFERENCE TO RELATED APPLICATIONS

This application is a national phase application of International Application No. PCT/JP2012/082796, filed Dec. 18, 2012, which is incorporated herein by reference.

TECHNICAL FIELD

The present invention relates to an exhaust emission control system of an internal combustion engine.

BACKGROUND ART

As an exhaust emission control apparatus provided in an exhaust passage of an internal combustion engine, an exhaust emission control apparatus in which a selective reduction type NOx catalyst (hereinafter referred to as SCR catalyst) is carried on a filter has been developed (see, for example, Patent Document 1). The filter collects particulate matter (hereinafter referred to as PM) in exhaust gas. The SCR catalyst reduces NOx in the exhaust gas using ammonia ($NH_3$) as a reducing agent. Such a filter carrying the SCR catalyst is hereinafter sometimes referred to as SCRF.

By adopting the SCRF as the exhaust emission control Apparatus, it is possible to reduce the size of the exhaust emission control apparatus compared with when the filter and the SCR catalysis are separately provided in the exhaust passage. Therefore, it is possible to improve mountability of the exhaust emission control apparatus. Further, by adopting the SCRF, it is possible to dispose the SCR catalyst further on an upstream side in the exhaust passage. As the SCR catalyst is disposed further on the upstream side in the exhaust passage, the SCR catalyst is more easily heated by the heat of the exhaust gas. Therefore, it is possible to attain improvement of warming-up properties of the SCR catalyst and improvement of an NOx removal rate in the SCR catalyst.

The collected PM deposits on the SCRF. Therefore, filter regeneration treatment is executed in the exhaust emission control system including the SCRF. The filter regeneration treatment is treatment for oxidizing the PM deposited on the SCRF and removing the PM. The filter regeneration treatment is realized by supplying fuel (HC) to a first stage catalyst, which is a catalyst provided in the exhaust passage upstream of the SCRF and having an oxidation function. When the fuel is oxidized in the first stage catalyst, the exhaust gas flowing into the SCRF is heated by oxidation heat. Therefore, it is possible to increase the temperature of the SCRF to a filter regeneration temperature at which the oxidation of the PM is facilitated.

Note that it is known that an HC adding valve for adding the HC and a urea adding valve for adding urea water are provided in the exhaust passage upstream of the SCR catalyst and, when a urea water amount necessary for removing the NOx by the SCR catalyst exceeds a predetermined upper limit amount, the HC is supplied in addition to the supply of the urea water (see, for example, Patent Document 2).

Incidentally, in the exhaust emission control system including the SCRF, when the filter regeneration treatment is carried out, a large amount of the HC is supplied to the first stage catalyst. In the conventional exhaust emission control system in which the SCR catalyst is provided downstream of the filter, most of the HC is oxidized in the first stage catalyst and the filter during the filter regeneration treatment. Therefore, an amount of the HC flowing into the SCR catalyst is relatively small. However, since only the first stage catalyst is present upstream of the SCRF, it is likely that the HC not fully oxidized by the first stage catalyst flows into the SCRF. When the HC flows into the SCRF, a part of the HC reduces the NOx. Therefore, when ammonia is supplied on the basis of an amount of the NOx flowing into the SCRF, the ammonia is oversupplied by an amount of the NOx reduced by the HC. That is, the ammonia more than necessary for reducing the NOx is supplied. Since the excess ammonia flows out from the SCRF, it is likely that the ammonia is wasted.

PRIOR ART REFERENCES

Patent Literatures

Patent Document 1: Japanese Translation of PCT Application No. 2007-501353

Patent Document 2: Japanese Patent Application Laid-Open No. 2008-157188

SUMMARY OF THE INVENTION

Problems to be Solved by the Invention

The present invention has been devised in view of the above problems and it is an object of the present invention to suppress ammonia from flowing out during regeneration treatment of a filter carrying an SCR catalyst.

Means for Solving the Problems

In order to attain the object, an exhaust emission control system of an internal combustion engine according to the present invention includes: at first stage catalyst provided in an exhaust passage of an infernal combustion engine and having an oxidation function; a fuel supply device configured to supply fuel to the first stage catalyst; a filter provided in the exhaust passage downstream of the first stage catalyst and configured to collect particulate matter in exhaust gas, the filter carrying a selective reduction type NOx catalyst that reduces NOx in the exhaust gas using ammonia as a reducing agent; an ammonia supply device configured to supply ammonia or a precursor of the ammonia to the filter; a filter-regeneration-treatment executing unit configured to execute filter regeneration treatment for supplying the fuel from, the fuel supply device to the first stage catalyst to raise temperature of the filter to a predetermined filter regeneration temperature, at which oxidation of the particulate matter is facilitated, to thereby oxidize and remove the particulate matter deposited on the filter; and a control unit configured to supply, when the filter regeneration treatment is not executed, the ammonia or the precursor of the ammonia in an amount corresponding to an amount of the NOx emitted from the internal combustion engine using the ammonia supply device, and to supply, when the filter regeneration treatment is executed, the ammonia or the precursor of the ammonia in an amount corresponding to an amount of the NOx obtained by subtracting, from the amount of the NOx emitted from the internal combustion engine, an amount of the NOx reduced by the fuel which is supplied by the fuel supply device and passes through the first stage catalyst.

In the exhaust emission control system of an internal combustion engine according to the present invention, the first stage catalyst and the SCRF are provided in order from an upstream side in the exhaust passage of the internal combustion engine. The ammonia or the precursor of the ammonia is supplied to the SCRF from the ammonia supply device. In the SCR catalyst carried on the SCRF, the NOx in the exhaust gas is reduced using, as the reducing agent, the supplied ammonia or ammonia generated from the supplied precursor of the ammonia. Since the fuel is supplied from the fuel supply device to the first stage catalyst, the filter regeneration treatment for removing the PM deposited on the SCRF is executed.

When the filter regeneration treatment is executed, the HC passed through the first stage catalyst without being oxidized in the first stage catalyst flows into the SCRF. The HC flowing into the SCRF in this way serves as the reducing agent that reduces the NOx.

In the present invention, when the filter regeneration treatment is executed, an amount of the ammonia or the precursor of the ammonia supplied from the ammonia supply device is reduced by an amount of the NOx reduced by the HC. When the filter regeneration treatment is not executed, since the NOx is hardly reduced by the HC, if the ammonia is supplied according to the amount of the NOx emitted from the internal combustion engine, it is possible to suppress excess or shortage from occurring in an amount of the reducing agent. On the other hand, when the filter regeneration treatment is executed, the NOx emitted from the internal combustion engine is reduced by the HC and the ammonia. Therefore, if the amount of the NOx reduced by the HC is subtracted from the amount of the NOx emitted from the internal combustion engine and the ammonia is supplied according to the remaining amount of the NOx, it is possible to suppress excess or shortage from occurring in the amount of the reducing agent. In this way, since excess or shortage does not occur in the amount of the reducing agent in the SCRF, it is possible to suppress the ammonia from flowing out from she SCRF.

In the present invention, when the filter regeneration treatment is executed, the control unit can change the amount of the ammonia or the precursor of she ammonia supplied by the ammonia supply device, on the basis of the temperature of the filter.

Since en amount of the ammonia reacting in the SCR catalyst changes according to the temperature of the filter, if the amount of the supplied ammonia is changed according to the temperature of the filter, it is possible to suppress excess or shortage from occurring in the amount of the reducing agent.

In the present invention, when the filter regeneration treatment is executed, the control unit can change the amount of the ammonia or the precursor of the ammonia supplied by the ammonia supply device, on the basis of an amount of moisture in the exhaust gas flowing into the filter.

Since the amount of the ammonia reacting in the SCR catalyst changes according to the amount of moisture in the exhaust gas flowing into the filter, if the amount of the supplied ammonia is changed according to the amount of moisture in the exhaust gas flowing into the filter, it is possible to suppress excess or shortage from, occurring in the amount of the reducing agent.

Effect of the Invention

According to the present invention, it is possible to suppress the ammonia from flowing out during the regeneration treatment of the filter carrying the SCR catalyst.

MODES FOR CARRYING OUT THE INVENTION

A mode for carrying out the present invention is illustratively explained in detail below on the basis of embodiments with reference to the drawings. However, dimensions, materials, shapes, relative arrangement, and the like of components described in the embodiments are not meant to limit the scope of the present invention only thereto unless specifically described otherwise.

First Embodiments

In a first embodiment, an exhaust emission control system of an internal combustion engine according to the present invention is applied, to a diesel engine for vehicle driving. However, the internal combustion engine according to the present invention is not limited to the diesel engine and may be a gasoline engine or the like.

Figure 1:
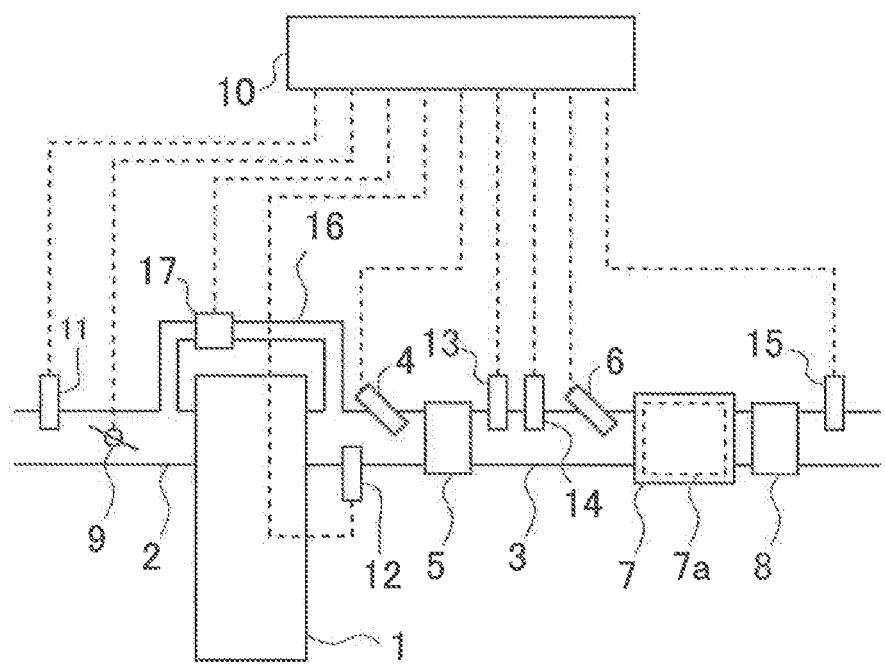
FIG. 1 is a diagram showing the schematic configuration of an air intake and exhaust, system of an internal combustion engine according to an embodiment.

FIG. 1 is a diagram showing the schematic configuration of an intake and exhaust system, of the internal combustion engine according to this embodiment. An internal combustion engine 1 is a diesel engine for vehicle driving. An intake passage 2 and an exhaust passage 3 are connected to the internal combustion engine 1. In the intake passage 2, an airflow meter 11 and a throttle valve 9 are provided. The airflow meter 11 detects an intake air amount of the internal combustion engine 1. The throttle valve 9 adjusts the intake air amount of the internal combustion engine 1.

In the exhaust passage 3, a first exhaust gas temperature sensor 12, a fuel adding valve 4, a first stage catalyst 5, a first NOx sensor 13, a second exhaust gas temperature sensor 14, an ammonia adding valve 6, an SCRF 7, a second stage catalyst 8, and a second NOx sensor 15 are provided in order from an upstream side along a flow of exhaust gas.

The first stage catalyst 5 is an oxidation catalyst. However, the first stage catalyst 5 may be a catalyst other than the oxidation catalyst as long as the catalyst is a catalyst having an oxidation function. The fuel adding valve 4 adds fuel (HC) in the exhaust gas in order to supply the fuel to the first stage catalyst 5.

Note that, in this embodiment, the fuel adding valve 4 is equivalent to the fuel supply device according to the present invention. However, it is also possible to supply the fuel to the first stage catalyst 5 by, without providing the fuel adding valve 4, executing sub-injection at timing when jetted fuel is discharged to the exhaust passage 3 in an un-burnt state without being burnt in the internal combustion engine 1.

The SCRF 7 is configured with an SCR catalyst 7a carried on a wall-flow type filter that collects PM in the exhaust gas. The SCR catalyst 7a reduces NOx in the exhaust air using ammonia as a reducing agent. The ammonia adding valve 6 adds an ammonia gas in the exhaust gas in order to supply the ammonia to the SCRF 7. When the ammonia is supplied to the SCRF 7, the ammonia once adheres to the SCR catalyst 7a carried on the SCRF 7. The NOx in the exhaust gas is reduced by the adhering ammonia functioning as the reducing agent.

Note that, in this embodiment, the ammonia adding valve 6 is equivalent to the ammonia supply device according to the present invention. However, the ammonia supply device according to the present invention may be a device that supplies the ammonia as liquid or solid. The ammonia supply device according to the present invention may be a device that supplies a precursor of the ammonia. For example, in this embodiment, a urea adding valve that adds a urea water solution in the exhaust gas may be provided instead of the ammonia adding valve 6. In this case, urea serving as the precursor of the ammonia is supplied to the SCRF 7. The urea undergoes hydrolysis, whereby the ammonia is generated.

The second stage catalyst 8 is an oxidation catalyst. However, the second stage catalyst 8 may be other catalysts having the oxidation function. The second stage catalyst 6 oxidizes the HC, CO, and the ammonia in the exhaust gas. Note that, in this embodiment, the second stage catalyst 8 is not always necessary.

The first exhaust gas temperature sensor 12 and the second exhaust gas temperature sensor 14 are sensors that detect the temperature of the exhaust gas. The first exhaust gas temperature sensor 12 detects the temperature of the exhaust gas flowing out from the internal combustion engine 1 or the temperature of the exhaust gas flowing into the first stage catalyst 5. The second exhaust gas temperature sensor 14 detects the temperature of the exhaust gas flowing out from the first stage catalyst 5 or the temperature of the exhaust gas flowing into the SCRF 7. The first NOx sensor 13 and the second NOx sensor 15 are sensors that detect the concentration of the NOx in the exhaust gas. The first NOx sensor 13 detects the concentration of the NOx in the exhaust gas flowing into the SCRF 1. The second NOx sensor 15 detects the concentration of the NOx in the exhaust gas flowing out from the second stage catalyst 8.

One end of an EGR passage 16 is connected to the upstream side of the fuel adding valve 4 in the exhaust passage 3. The other end of the EGR passage 16 is connected to the downstream side of the throttle valve 9 in the intake passage 2. An EGR valve 17 is provided in the EGR passage 16.

With such a configuration, a part of the exhaust gas emitted from the internal combustion engine 1 is introduced into the intake passage 2 through the EGR passage 16 as an EGR gas. Consequently, the EGR gas is supplied to the internal combustion engine 1. A flow rate of the EGR gas introduced into the intake passage 2 through the EGR passage 16 is adjusted by the EGR valve 17. Note that, in this embodiment, the EGR passage 16 and the EGR valve 17 are not always necessary.

An electronic control unit (ECU) 10 is juxtaposed with the internal combustion engine 1. Various sensors such as the airflow meter 11, the first exhaust gas temperature sensor 12, the first NOx sensor 13, the second exhaust gas temperature sensor 14, and the second NOx sensor 15 are electrically connected to the ECU 10. Output signals of the various sensors are input to the ECU 10. The ECU 10 estimates a flow rate of the exhaust gas in the exhaust passage 3 on the basis of an output value of the airflow meter 11. The ECU 10 estimates the temperature of the first stage catalyst 5 on the basis of an output value of the first exhaust gas temperature sensor 12 and estimates the temperature of the SCRF 7 (i.e., the temperature of the SCR catalyst 7a) on the basis of an output value of the second exhaust gas temperature sensor 14.

Further, the throttle valve 9, the fuel adding valve 4, the ammonia adding valve 6, and the EGR valve 17 are electrically connected to the ECU 10. These devices are controlled by the ECU 10.

Collected PM gradually deposit s on the SCRF 7. Therefore, in this embodiment, filter regeneration treatment for removing the PM deposited on the SCRF 7 is executed by the ECU 10. The filter regeneration treatment according to this embodiment is realized by adding the fuel from the fuel adding valve 4 to thereby supply the fuel to the first stage catalyst 5. Note that the ECU 10 that executes the filter regeneration treatment in this embodiment is equivalent to the filter-regeneration-treatment executing unit in the present invention.

When the fuel is oxidized in the first stage catalyst 5, oxidation heat is generated. The exhaust gas flowing into the SCRF 7 is heated by the oxidation heat. Consequently, the temperature of the SCRF 7 rises. During the execution of the filter regeneration treatment, a fuel addition amount from the fuel adding valve 4 is controlled to raise the temperature of the SCRF 7 to a predetermined filter regeneration temperature (e.g., 600 to 650° C.) at which the oxidation of the PM is facilitated. As a result, the PM deposited on the SCRF 7 is oxidized and removed.

In this embodiment, the execution of the filter regeneration treatment is requested every time a predetermined time elapses after the execution of the last filter regeneration treatment ends. Note that the execution of the filter regeneration treatment may be requested every time a vehicle mounted with the internal combustion engine 1 travels a predetermined travel distance. The execution of the filter regeneration treatment may be requested every time a PM deposit amount in the SCRF 7 reaches a predetermined deposit amount. The PM deposit amount in the SCRF 7 can be estimated on the basis of histories of a fuel injection amount in the internal combustion engine 1, a flow rate of the exhaust gas flowing into the SCRF 7, the temperature of the SCRF 7, and the like.

During the execution of the filter regeneration treatment, a part of the HC included in the fuel supplied to the first stage catalyst 5 is sometimes not oxidized in the first stage catalyst 5 and passes through the first stage catalyst 5. The HC passed through the first stage catalyst 5 flows into the SCRF 7. The HC flowed into the SCRF 7 serves as a reducing agent that reduces the NOx in the SCR catalyst 7a.

Incidentally, even during the execution of the filter regeneration treatment, the ammonia is added from, the ammonia adding valve 6 in order to reduce the NOx. During the execution of the filter regeneration treatment, even if the ammonia is absorbed by the SCR catalyst 7a, since temperature is high, the ammonia immediately desorbs. Therefore, an amount of the ammonia added from the ammonia adding valve 6 is an amount that does not cause excess or shortage with respect to an amount necessary for reduction of the NOx.

When the filter regeneration treatment is not executed, the ammonia only has to be added from the ammonia adding valve 6 according to an amount of the NOx emitted from the internal combustion engine 1 or an amount of the NOx flowing into the SCRF 7. That is, if an amount of the ammonia necessary for reducing the NOx emitted from the internal combustion engine 1 is supplied, an amount of the ammonia consumed in the SCR catalyst 7a and an amount of the supplied ammonia are balanced. Therefore, it is possible to suppress excess or shortage from occurring in an amount of the ammonia in the SCR catalyst 7a. Note that the amount of the NOx emitted from the internal combustion engine 1 can be estimated on the basis of engine speed and an engine load. The amount of the NOx emitted from the internal combustion engine 1 can also be calculated on the basis of a detection value of the first NOx sensor 13 and a flow rate of the exhaust gas estimated from an intake air amount detected by the airflow meter 11. Note that the amount of the NOx discharged from the internal combustion engine 1 may be equal to the amount of the NOx flowing into the SCR catalyst 7a.

On the other hand, when the filter regeneration treatment is executed, the NOx is also reduced in the SCR catalyst 7a by the HC added from the fuel adding valve 4 and not oxidized in the first stage catalyst 5. Therefore, if the ammonia is added from the ammonia adding valve 6 not to cause excess or shortage with respect to the amount of the NOx emitted from the internal combustion engine 1 or the amount of the NOx flowing into the SCRF 7, the ammonia is oversupplied by the amount of the NOx reduced by the HC. The oversupplied ammonia desorbs from the SCR catalyst 7a because the temperature of the SCR catalyst 7a is high and flows out from the SCRF 7. Thereafter, it is possible to cause the ammonia to react in the second stage catalyst 8. However, the ammonia is uselessly consumed.

Therefore, in this embodiment, when the filter regeneration treatment is executed, the ammonia is supplied from the ammonia adding valve 6 according to an amount of the NOx determined by subtracting the amount of the NOx reduced by the HC from the amount of the NOx emitted from the internal combustion engine 1 or the amount of the NOx flowing into the SCRF 7. Note that an ammonia supply amount from the ammonia adding valve 6 may be calculated by subtracting an ammonia amount necessary for reducing the NOx reduced by the HC from an ammonia amount necessary for reducing ail the NOx emitted from the internal combustion engine 1 or the NOx flowing into the SCRF 7.

Figure 2:
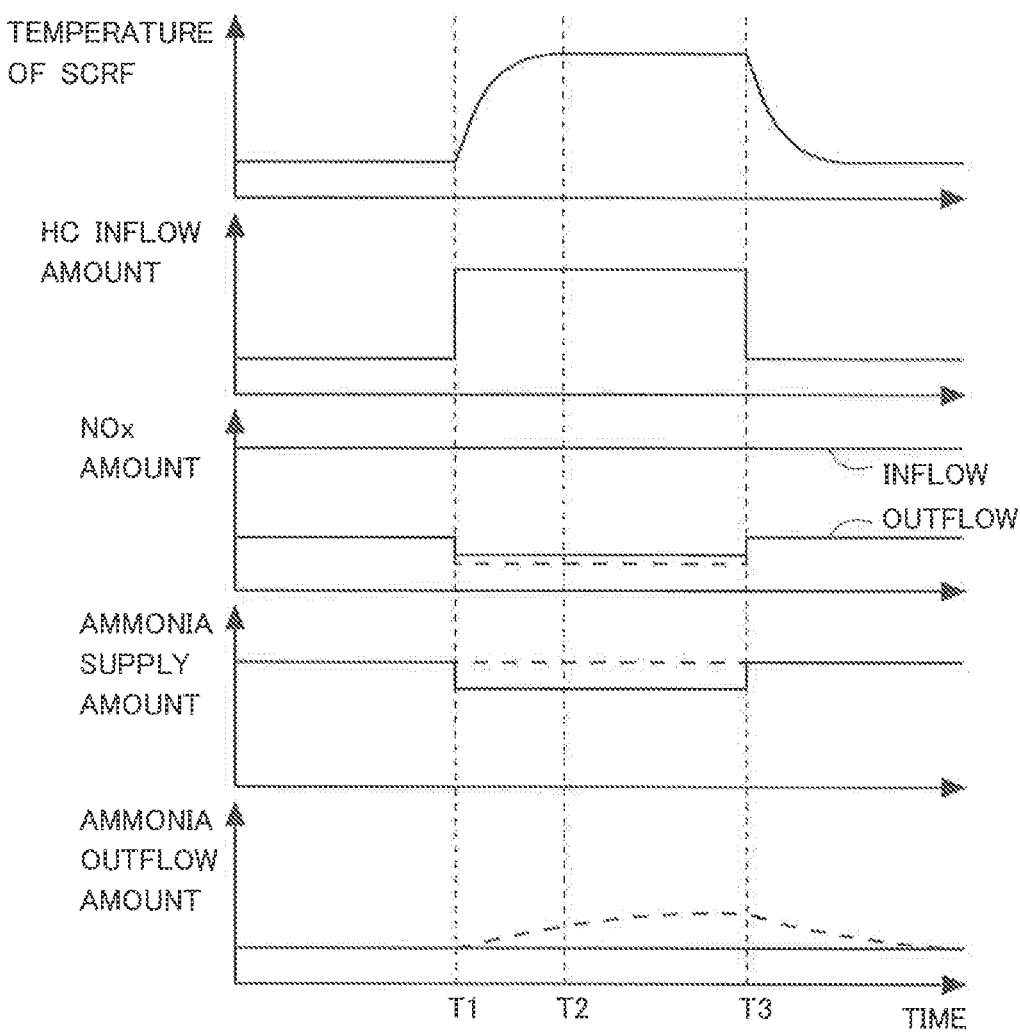
FIG. 2 is a time chart showing transition of the temperature of an SCR catalyst, an amount of HC flowing into an SCRF (an HC inflow amount), an amount of NOx flowing into or flowing out from the SCRF, an ammonia supply amount from an ammonia adding valve, and an amount of ammonia flowing out from the SCRF (an ammonia outflow amount) from before filter regeneration treatment is executed to after the filter regeneration treatment is completed.

FIG. 2 is a time chart showing transition of the temperature of the SCRF 7 (or the SCR catalyst 7a), an amount of the HC flowing into she SCRF 7 (en HC inflow amount), an amount of the NOx flowing into or flowing out from the SCRF 7, an ammonia supply amount from the ammonia adding valve 6, and an amount of the ammonia flowing out from the SCRF 7 (an ammonia outflow amount) from before filter regeneration treatment is executed to after the filter regeneration, treatment is completed. Solid lines indicate a case in which the ammonia supply amount is reduced taking into account the amount of the NOx reduced by the HC. Broken lines indicate a case in which the ammonia supply amount is determined according to the amount of the NOx emitted from the internal combustion engine 1. That is, the broken lines indicate a case in which the ammonia supply amount is determined without taking into account the amount of the NOx reduced by the HC. At a point in time T1, the filter regeneration treatment is started. At a point in time T2, the temperature of the SCRF reaches the predetermined filter regeneration temperature, which is temperature at which oxidation of the PM is facilitated. When the filter regeneration treatment is executed, the ECU 10 adjusts a fuel addition amount from the fuel adding valve 4 such that the temperature of the SCRF 7 maintains the predetermined filter regeneration temperature. At a point in time T3, the filter regeneration treatment ends. In a period of T2 to T3, the PM is oxidized and removed.

In a period of T1 to T3, since a large amount of the fuel is added from the fuel adding valve 4, an HC inflow amount increases. At this point, the amount of the NOx flowing into the SCRF 7 is the same in the case of the solid line and the case of the broken line. Note that the amount of the NOx flowing out from the SCRF 7 is smaller in the case of the broken line than in the case of the solid line because the NOx removal rate is high because the reducing agent is excessively present. However, in this state, the ammonia supply amount from the ammonia adding valve 6 and the ammonia supply amount flowing out from the SCRF 7 increase and the ammonia is uselessly supplied. On the other hand, in the case of the solid line, it is possible to suppress the NOx and the ammonia from flowing out from the SCRF 7. The ammonia supply amount from the ammonia adding valve 6 is smaller in the case of the solid line than in the case of the broken line. Therefore, it is possible to reduce a consumed amount of the ammonia.

The amount of the HC flowing into the SCRF 7 is related to the temperature of the first stage catalyst 5 and the fuel addition amount from the fuel adding valve 4. Therefore, a relation between the HC amount and the temperature and the fuel addition amount is calculated by an experiment or a simulation and stored in the ECU 10 in advance. Then, the amount of the HC flowing into the SCRF 7 can be calculated on the basis of the temperature of the first stage catalyst 5 and the fuel addition amount from the fuel adding valve 4.

Figure 3:
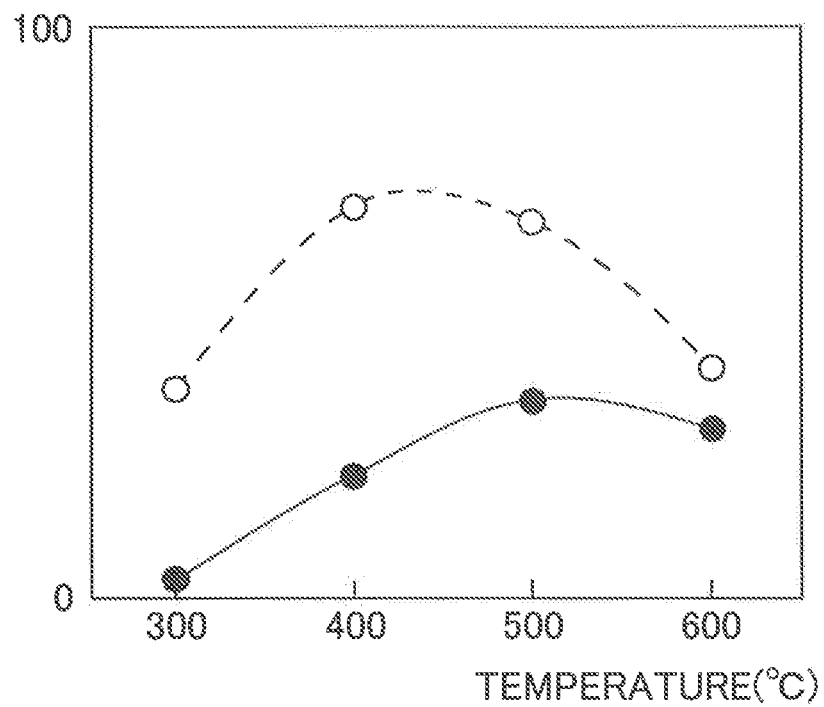
FIG. 3 is a diagram showing relations between the temperature of the SCR catalyst and an NOx removal rate by the HC respectively concerning a case in which moisture is included in exhaust gas and a case in which moisture is not included in the exhaust gas.

Not all of the HC flowing into the SCRF 7 reduces the NOx. The NOx removal rate by the HC changes according to a type of the SCR catalyst 7a, an amount of moisture in the exhaust gas, and the temperature of the SCR catalyst 7a. FIG. 3 is a diagram showing a relation between the temperature of the SCR catalyst 7a and the NOx removal rate by the HC concerning each of a case in which moisture is included in the exhaust gas (a solid line) and a case in which moisture is not included in the exhaust gas (a broken line). This relation changes according to a type of the SCR catalyst 7a.

In this way, the NOx removal rate by the HC changes according to presence or absence of moisture and the temperature of the SCR catalyst 7a. Therefore, in this embodiment, the amount of the NOx reduced by the HC is corrected according to the amount of moisture in the exhaust gas and the temperature of the SCR catalyst 7a. Note that the amount of moisture in the exhaust gas can be calculated from an amount of the fuel supplied to the internal combustion engine 1, an intake air amount of the internal combustion engine 1, an EGR gas amount, and the like. In this way, the amount of the NOx reduced by the HC is more accurately calculated. Consequently, it is possible to more accurately calculate a necessary ammonia amount.

Figure 4:
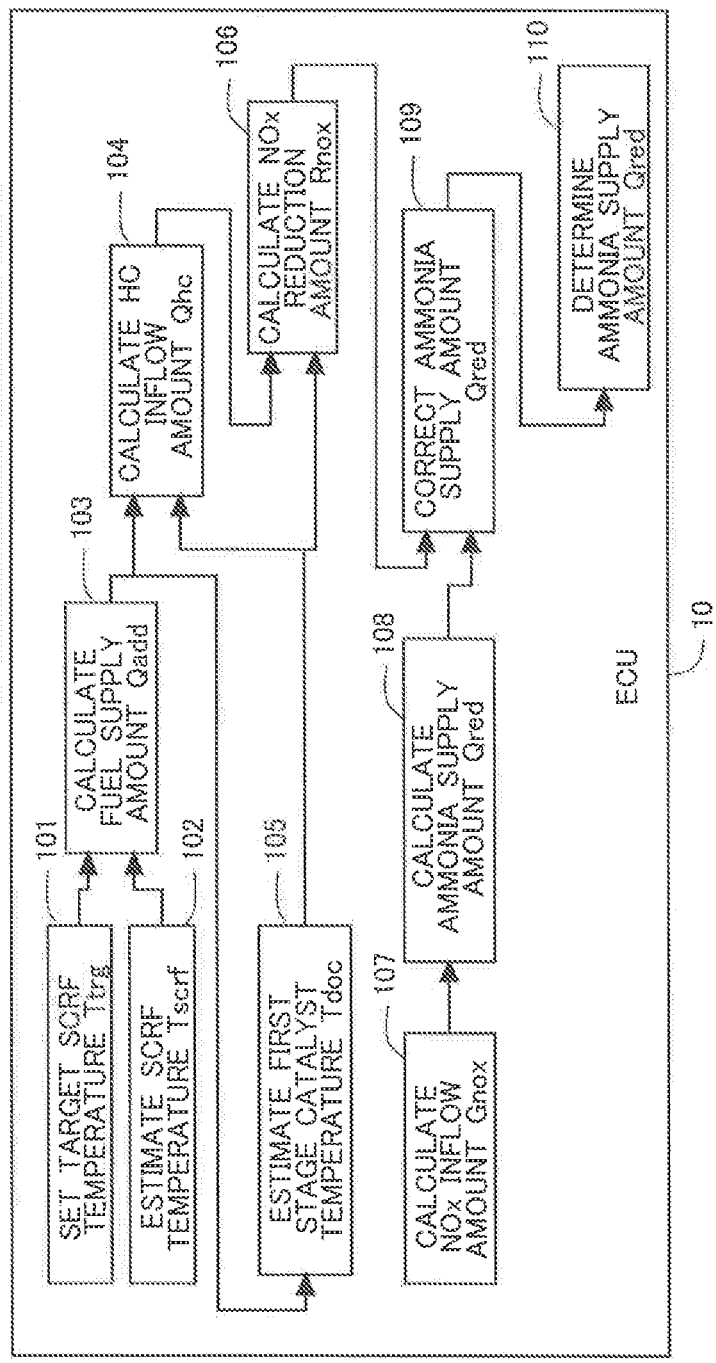
FIG. 4 is a block diagram in determining an ammonia supply amount Qred from the ammonia adding valve during execution of the filter regeneration treatment.

FIG. 4 is a block diagram in determining an ammonia supply amount Qred from the ammonia adding valve 6 during the execution of the filter regeneration treatment.

When the execution of the filter regeneration treatment is requested, in 101, a target SCRF temperature Ttrg, which is temperature at which oxidation of the PM is facilitated, is set. In 102, the temperature of the SCRF 7 at the present point (an SCRF temperature Tscrf) is estimated. Note that the target SCRF temperature Ttrg is the predetermined filter regeneration temperature (e.g., 600 to 650° C.) and is set in advance. The SCRF temperature Tscrf is estimated on the basis of a detection value of the second exhaust gas temperature sensor 14 and an intake air amount Ga detected by the airflow meter 11. In 103, a fuel supply amount Qadd necessary for raising the temperature of the SCRF 7 to the target SCRF temperature Ttrg is calculated. The fuel supply amount Qadd is calculated on the basis of the temperature of the SCRF 7 at the present point (the SCRF temperature Tscrf) and the target SCRF temperature Ttrg. A map or a formula for calculating the fuel supply amount Qadd may be calculated from the SCRF temperature Tscrf and the target SCRF temperature Ttrg and stored in the ECU 10.

In 104, the amount of the HC flowing into the SCRF 7 (an HC inflow amount Qhc) is calculated on the basis of the fuel supply amount Qadd and the temperature of the first stage catalyst 5 (a first stage catalyst temperature Tdoc). The temperature of the first stage catalyst 5 changes according to fuel addition. Since the HC inflow amount Qhc changes according to the temperature of the first stage catalyst 5 (the first stage catalyst temperature Tdoc), when the HC inflow amount Qhc is calculated, the first stage catalyst temperature Tdoc is taken into account. The first stage catalyst temperature Tdoc changes according to a detection value of the first exhaust gas temperature sensor 12, the intake air amount Ga obtained by the airflow meter 11, a fuel amount Gf supplied into the cylinder of the internal combustion engine 1, and the fuel supply amount Qadd from the fuel adding valve 4. Therefore, in 105, the first stage catalyst temperature Tdoc is calculated on the basis of the detection value of the first exhaust gas temperature sensor 12, the intake air amount Ga obtained by the airflow meter 11, the fuel amount Gf supplied into the cylinder of the internal combustion engine 1, and the fuel supply amount Qadd from the fuel adding valve 4. A map or a formula for calculating the first stage catalyst temperature Tdoc may be calculated and stored in the ECU 10 in advance. A map or a formula for calculating the HC inflow amount Qhc may be calculated from the fuel supply amount Qadd and the first stage catalyst temperature Tdoc and stored in the ECU 10.

In 106, the amount of the NOx reduced by the HC in the SCRF 7 (an NOx reduction amount Rnox) is calculated on the basis of the amount of the NOx flowing into the SCRF 7 (an NOx inflow amount Gnox), the SCRF temperature Tscrf, the first stage catalyst temperature Tdoc, the HC inflow amount Qhc, and an amount of moisture Oh2o in the exhaust gas. In 107, the NOx inflow amount Gnox is calculated from NOx concentration in the exhaust gas flowing into the SCRF 7 obtained by the first NOx sensor 13, the intake air amount Ga obtained by the airflow meter 11, and the fuel amount Gf supplied into the cylinder of the internal combustion engine 1. Even if the NOx inflow amount Gnox increases, the NOx removal rate by the HC hardly changes. Therefore, the NOx reduction amount Rnox increases. That is, the NOx reduction amount Rnox changes according to the NOx inflow amount Gnox. The NOx removal rate by the HC changes according to the SCRF temperature Tscrf. That is, the NOx reduction amount Rnox changes according to the SCRF temperature Tscrf. As the HC inflow amount Qhc is larger, the NOx reduction amount Rnox is larger. The NOx reduction amount Rnox changes according to the amount of moisture in the exhaust gas and the first stage catalyst temperature Tdoc. The change in the NOx reduction amount Rnox is explained below. A relation among the NOx inflow amount Gnox, the SCRF temperature Tscrf, the first stage catalyst temperature Tdoc, the HC inflow amount Qhc, the amount of moisture Qh2o in the exhaust gas, and the NOx reduction amount Rnox is calculated by an experiment, a simulation, or the like and stored in the ECU 10 in advance.

In 108, the ammonia supply amount Qred from the ammonia adding valve 6 is calculated. The ammonia supply amount Qred calculated in 108 is an ammonia supply amount calculated not taking into account the NOx by the HC and is an ammonia supply amount before correction. When the filter regeneration treatment is not executed, the amount of the ammonia supplied from the ammonia adding valve 6 may be set as the ammonia supply amount Qred calculated an 108. In 108, an ammonia amount for reducing ail the NOx flowing into the SCRF 7 is calculated as the ammonia supply amount Qred on the basis of the NOx inflow amount Gnox. Note that, since the NOx removal rate changes according to the SCRF temperature Tscrf, the necessary ammonia amount also changes. Therefore, the ammonia supply amount Qred may be corrected according to the SCRF temperature Tscrf. A relation between the ammonia supply amount Qred and the SCRF temperature Tscrf is calculated by an experiment, a simulation, or the like and stored in the ECU 10 in advance.

In 109, an ammonia amount corresponding to the NOx reduction amount Rnox is subtracted from the ammonia supply amount Qred to correct the ammonia supply amount Qred. In 110, a final ammonia supply amount Qred is determined. The ammonia is supplied from the ammonia adding valve 6 according to the final ammonia supply amount Qred.

Note that the NOx reduction amount Rnox in the first stage catalyst 5 changes according to the amount of moisture Qh2o in the exhaust gas and the first stage catalyst temperature Tdoc. Therefore, the NOx reduction amount Rnox may be corrected according to the amount of moisture Qh2o in the exhaust gas and the first stage catalyst temperature Tdoc. The amount of moisture Qh2o in the exhaust gas is calculated, on the basis of an amount of moisture Qh2oi already included before burning in the cylinder of the internal combustion engine 1, an amount of moisture Qh2oc generated by the burning in the cylinder of the internal combustion engine 1, and an amount of moisture Qheoe generated in the first stage catalyst 5.

Note that a reaction described below occurs during the burning of the fuel.

$$C_mH_n+(m+n/4)O_2\rightarrow mCO_2+(n/2)H_2O \qquad \text{(Expression 1)}$$

The amount of moisture $Q_{h2oi}$ already included before the burning in the cylinder of the internal combustion engine 1 can be calculated from the intake air amount Ga, the fuel amount Gf supplied into the cylinder, an EGR gas amount Gegr, and a ratio Rhc of H and C of the fuel, and the like. The intake air amount Ga is detected by the airflow meter 11. The fuel amount Gf and the EGR gas amount Gegr are calculated from an operation state of the internal combustion engine 1 and a map stored in the ECU 10. The ratio Rhc of H and C of the fuel is a value (n/m) obtained by dividing n by m of the above Expression 1. A ratio of H and C of fuel assumed to be supplied is stored in the ECU 10 in advance.

Figure 5:
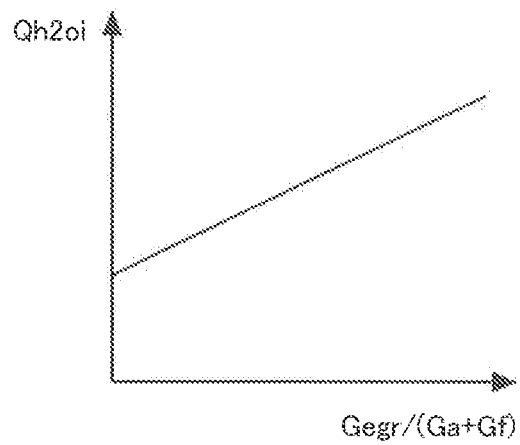
FIG. 5 is a diagram showing a relation between Gegr/(Ga+Gf) and an amount of moisture Oh2oi already included before burning in a cylinder of the internal combustion engine.

For example, FIG. 5 is a diagram showing a relation between Gegr/(Ga+Gf) and the amount of moisture $Q_{h2oi}$ already included before the burning in the cylinder of the internal combustion engine 1. The abscissa indicates a value obtained by dividing the EGR gas amount Gegr by a total value of the intake air amount Ga and the fuel amount Gf. As the EGR gas amount Gegr is larger, the amount of moisture $Q_{h2oi}$ already included before the burning in the cylinder of the internal combustion engine 1 is larger. That is, the amount of moisture $Q_{h2oi}$ already included before the burning in the cylinder of the internal combustion engine 1 can also be calculated on the basis of the intake air amount Ga, the fuel amount Gf supplied into the cylinder, and the EGR gas amount Gegr and on the basis of the relation shown in FIG. 5. A map or a formula for calculating the amount of moisture $Q_{h2oi}$ already included before the burning in the cylinder of the internal combustion engine 1 is calculated by an experiment or a simulation and stored in the ECU 10 in advance.

The amount of moisture $Q_{h2oc}$ generated by the burning in the cylinder of the internal combustion engine 1 can be calculated from the intake air amount Ga, the fuel amount Gf supplied into the cylinder, the ratio Rhc of H and C of the fuel, and the like.

Figure 6:
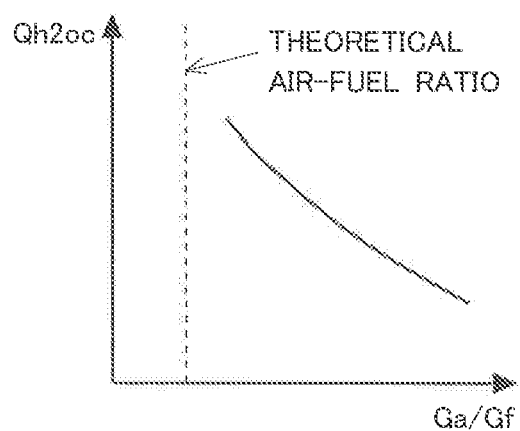
FIG. 6 is a diagram, showing a relation between an air-fuel ratio (Ga/Gf) and an amount of moisture Qh2oc generated by the burning in the cylinder of the internal combustion engine.
Figure 7:
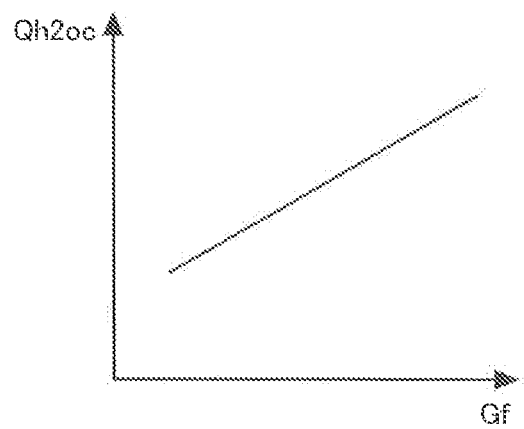
FIG. 7 is a diagram, showing a relation between a fuel amount Gf and the amount of moisture Qh2oc generated by the burning in the cylinder of the internal combustion engine.

For example, FIG. 6 is a diagram showing a relation between an air-fuel ratio (Ga/Gf) and the amount of moisture $Q_{h2oc}$ generated by the burning in the cylinder of the internal combustion engine 1. As the fuel amount Gf is larger, the amount of moisture $Q_{h2oc}$ generated by the burning in the cylinder of the internal combustion engine 1 is larger. FIG. 7 is a diagram showing a relation between the fuel amount Gf and the amount of moisture $Q_{h2oc}$ generated by the burning in the cylinder of the internal combustion engine 1, As the fuel amount Gf is larger, the amount of moisture $Q_{h2oc}$ generated by the burning in the cylinder of the internal combustion engine 1 is larger. In this way, the amount of moisture $Q_{h2oc}$ generated by the burning in the cylinder of the internal combustion engine 1 can also be calculated on the basis of the relation shown in FIG. 6 or FIG. 7. A map or a formula for calculating the amount of moisture $Q_{h2oc}$ generated by the burning in the cylinder of the internal combustion engine 1 is calculated by an experiment or a simulation and stored in the ECU 10 in advance.

The amount of moisture $Q_{heoe}$ generated in the first stage catalyst 5 can be calculated from the first stage catalyst temperature Tdoc, the fuel supply amount Qadd from the fuel adding valve 4, the ratio Rhc of H and C of the fuel, a flow rate of the exhaust gas, and the like. Note that the flow rate of the exhaust gas is calculated on the basis of the intake air amount Ga, the fuel amount Gf supplied into the cylinder, and the EGR gas amount Gegr.

Figure 8:
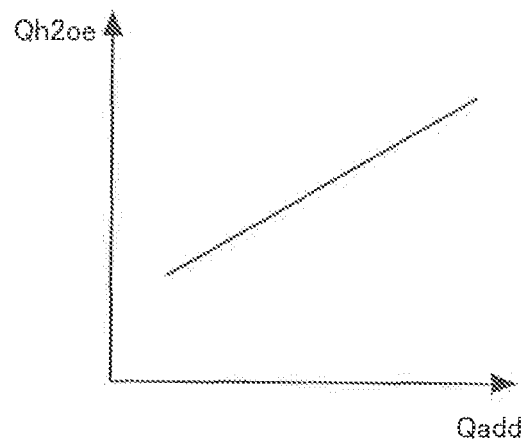
FIG. 8 is a diagram showing a relation between a fuel supply amount Qadd from a fuel adding valve and an amount of moisture Qheoe generated in a first stage catalyst.
Figure 9:
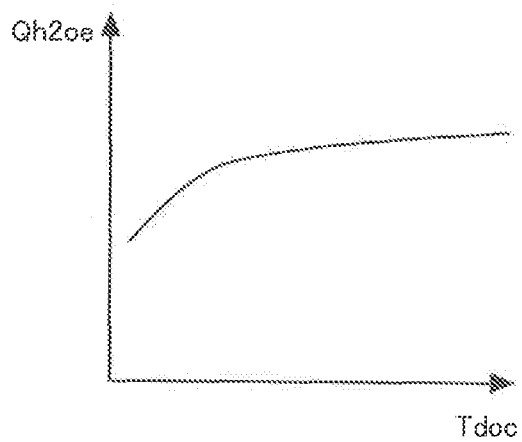
FIG. 9 is a diagram showing a relation between a first stage catalyst temperature Tdoc and the amount of moisture Qheoe generated in the first stage catalyst.

For example, FIG. 8 is a diagram showing a relation between the fuel supply amount Qadd from the fuel adding valve 4 and the amount of moisture $Q_{heoe}$ generated in the first stage catalyst 5. As the fuel supply amount Qadd is larger, the amount of moisture $Q_{heoe}$ generated in the first stage catalyst 5 is larger. FIG. 9 is a diagram showing a relation between the first stage catalyst temperature Tdoc and the amount of moisture $Q_{heoe}$ generated in the first stage catalyst 5. As the first stage catalyst temperature Tdoc is larger, the amount of moisture $Q_{heoe}$ generated in the first stage catalyst 5 is larger. In this way, the amount of moisture $Q_{heoe}$ generated in the first stage catalyst 5 can also be calculated on the basis of the relation shown in FIG. 8 or FIG. 9. A map or a formula for calculating the amount of moisture $Q_{heoe}$ generated in the first stage catalyst 5 is calculated by an experiment or a simulation and stored in the ECU 10 in advance.

The amount of moisture $Q_{h2o}$ in the exhaust gas can be calculated by adding up the amount of moisture $Q_{h2oi}$ already included before the burning in the cylinder of the internal combustion engine 1, the amount of moisture $Q_{h2oc}$ generated by the burning in the cylinder of the internal combustion engine 1, and the amount of moisture $Q_{heoe}$ generated in the first stage catalyst 5. Note that an amount of moisture may be converted into volume concentration and used according to necessity.

Figure 10:
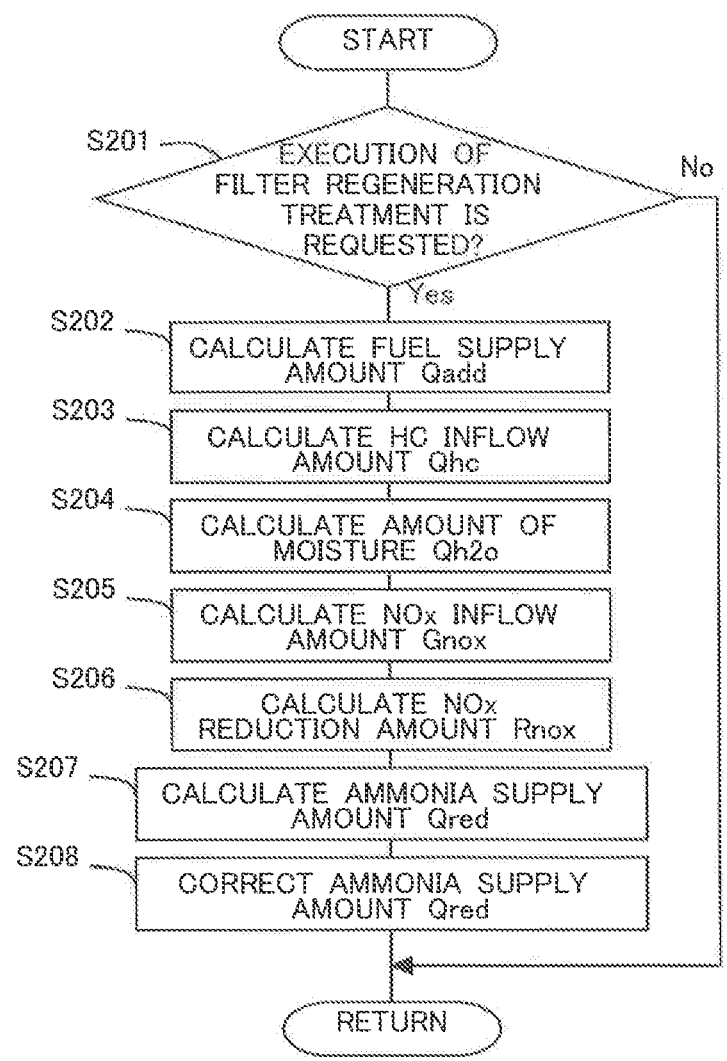
FIG. 10 is a flowchart for explaining a flow of filter regeneration treatment according to the embodiment.

A flow of the filter regeneration treatment according to this embodiment is explained with reference to FIG. 10. FIG. 10 is a flowchart for explaining a flow of the filter regeneration treatment according to this embodiment. This flow is stored in the ECO 10 in advance and repeatedly executed by the ECU 10. Note that, in this embodiment, the ECU 10 that executes the flow shown in FIG. 10 is equivalent to the control unit in the present invention.

In step S201, it is determined whether execution of the filter regeneration treatment is requested. For example, the execution of the filter regeneration treatment is requested every time the predetermined time elapses after the execution of the last filter regeneration treatment ends. The execution of the filter regeneration treatment may be requested every time the vehicle mounted with the internal combustion engine 1 travels the predetermined travel distance. The execution of the filter regeneration treatment may be requested every time the PM deposit amount in the SCRF 7 reaches the predetermined deposit amount. When positive determination is made in step S201, the processing proceeds to step S202. On the other hand, when negative determination is made in step S201, this routine is finished. Note that, when the negative determination is made in step S201, the filter regeneration treatment is not carried out. Therefore, an amount of the ammonia supplied from the ammonia adding valve 6 is determined according to the amount of the NOx emitted from the internal combustion engine 1 or the amount of NOx flowing into the SCRF 7.

In step S202, the fuel supply amount Qadd from the fuel adding valve 4 is calculated on the basis of the SCRF temperature Tscrf and the target SCRF temperature Ttrg. The fuel supply amount Qadd is a fuel amount necessary for raising the temperature of the SCRF 7 to the predetermined filter regeneration temperature at which oxidation of the PM is facilitated.

In step S203, the amount of the HC flowing into the SCRF 7 (the HC inflow amount Qhc) is calculated on the basis of the first stage catalyst temperature Tdoc and the fuel supply amount Qadd.

In step S204, the amount of moisture $Q_{h2o}$ in the exhaust gas is calculated on the basis of the fuel amount Gf, the intake air amount Ga, the EGR gas amount Gegr, and the like.

In step S205, tree amount of the NOx flowing into the SCRF 7 the NOx inflow amount Gnox) is calculated on the basis of the NOx concentration in the exhaust gas flowing into the SCRF 7, the intake air amount Ga, and the fuel amount Gf.

In step S206, the NOx reduction amount Rnox is calculated on the basis of the NOx inflow amount Gnox, the SCRF temperature Tscrf, the first stage catalyst temperature Tdoc, the HC inflow amount Qhc, and the amount of moisture Qh2o in the exhaust gas.

In step S207, the amount of the ammonia added from the ammonia adding valve 6 (the ammonia supply amount Qred) is calculated on the basis of the NOx inflow amount Gnox and the SCRF temperature Tscrf. Note that, since the removal rate of the NOx changes according to the SCRF temperature Tscrf, the necessary ammonia amount also changes. Therefore, the ammonia supply amount Qred is calculated taking into account not only the NOx inflow amount Gnox but also the SCRF temperature Tscrf. A relation between the ammonia supply amount Qred and the NOx inflow amount Gnox and the SCRF temperature Tscrf is calculated by an experiment, a simulation, or the like and stored in the ECU 10 in advance.

In step S208, the ammonia supply amount Qred is corrected on the basis of the NOx reduction amount Rnox by the HC. That is, since the ammonia is unnecessary by the amount of the NOx reduced by the HC, an amount of the ammonia corresponding to the NOx reduction amount Rnox by the HC is subtracted from the ammonia supply amount Qred.

Note that, in the flow shown in FIG. 10, the ammonia supply amount Qred is corrected by subtracting the amount of the ammonia corresponding to the NOx reduction amount Rnox by the HC from the ammonia supply amount Qred. However, instead, an amount of the ammonia corresponding to the amount of the NOx calculated by subtracting the NOx reduction amount Rnox by the HC from the NOx inflow amount Gnox may be calculated as the ammonia supply amount Qred.

As explained above, according to this embodiment, when the filter regeneration treatment is executed, the amount of the ammonia supplied from the ammonia adding valve 6 is reduced by the amount of the NOx reduced by the HC. Therefore, it is possible to suppress the ammonia from being uselessly consumed. It is possible to suppress the ammonia from flowing out downward of the SCRF 7, The ammonia supply amount is determined taking into account the temperature of the SCRF 7 or the amount of moisture in the exhaust gas. Consequently, it is possible to further suppress the ammonia from flowing out downstream of the SCRF 7.

EXPLANATION OF REFERENCE NUMERALS AND CHARACTERS

1 Internal combustion engine
2 Intake passage
3 Exhaust passage
4 Fuel adding valve
5 First stage catalyst
6 Ammonia adding valve
7 SCRF
7a Selective reduction type NOx catalyst (SCR catalyst)
8 Second stage catalyst
9 Throttle valve
10 ECU
11 Airflow meter
12 First exhaust gas temperature sensor
13 First NOx sensor
14 Second exhaust gas temperature sensor
15 Second NOx sensor
16 EGR passage
17 EGR valve

The invention claimed is:

1. An exhaust emission control system of an internal combustion engine, comprising:
a first stage catalyst provided in an exhaust passage of an internal combustion engine and having an oxidation function;
a fuel supply device configured to supply fuel to the first stage catalyst;
a filter provided in the exhaust passage downstream of the first stage catalyst and configured to collect particulate matter in exhaust gas, the filter carrying a selective reduction type NOx catalyst that reduces NOx in the exhaust gas using ammonia as a reducing agent;
an ammonia supply device configured to supply ammonia or a precursor of the ammonia to the filter;
a filter-regeneration-treatment executing unit configured to execute filter regeneration treatment for supplying the fuel from the fuel supply device to the first stage catalyst to raise temperature of the filter to a predetermined filter regeneration temperature, at which oxidation of the particulate matter is facilitated, to thereby oxidize and remove the particulate matter deposited on the filter; and
a control unit configured to supply, when the filter regeneration treatment is not executed, the ammonia or the precursor of the ammonia in an amount corresponding to an amount of the NOx emitted from the internal combustion engine using the ammonia supply device, and to supply, when the filter regeneration treatment is executed, the ammonia or the precursor of the ammonia in an amount corresponding to an amount of the NOx obtained by subtracting, from the amount of the NOx emitted from the internal combustion engine, an amount of the NOx reduced by the fuel which is supplied by the fuel supply device and passes through the first stage catalyst.

2. The exhaust emission control system of an internal combustion engine according to claim 1, wherein, when the filter regeneration treatment is executed, the control unit changes the amount of the ammonia or the precursor of the ammonia supplied by the ammonia supply device, on the basis of the temperature of the filter.

3. The exhaust emission control system of an internal combustion engine according to claim 1, wherein, when the filter regeneration treatment is executed, the control unit changes the amount of the ammonia or the precursor of the ammonia supplied by the ammonia supply device, on the basis of an amount of moisture in the exhaust gas flowing into the filter.

* * * * *